T. F. STANTON.
HANDLE BAR GRIP.
APPLICATION FILED JULY 28, 1915.
1,165,142.
Patented Dec. 21, 1915.
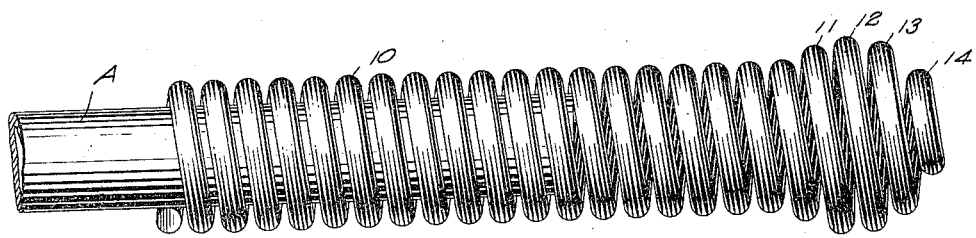
WITNESSES
INVENTOR
T. F. Stanton
BY
ATTORNEYS

UNITED STATES PATENT OFFICE.

THOMAS FRANKLIN STANTON, OF DENTON, KANSAS.

HANDLE-BAR GRIP.

1,165,142.  Specification of Letters Patent.  Patented Dec. 21, 1915.

Application filed July 28, 1915.   Serial No. 42,287.

*To all whom it may concern:*

Be it known that I, THOMAS F. STANTON, a citizen of the United States, and a resident of Denton, in the county of Doniphan and State of Kansas, have invented a new and Improved Handle-Bar Grip, of which the following is a full, clear, and exact description.

My invention relates to a grip for the handle bar of a motor cycle, and the like, and particularly to a grip in the form of a wire coil adapted to be slipped onto the handle bar to retain its position by the springing action of the coil at one end, the opposite end being designed to project beyond the handle bar and form the shock absorbing grip.

The invention will be particularly explained in the specific description following. Reference should be had to the accompanying drawings in which the figure represents a side elevation of a handle bar grip embodying my invention and showing the same applied to a portion of a handle bar.

My improved grip is adapted to be secured to the end of a handle bar A, a portion of which is represented. The grip is in the form of a wire coil. The convolutions 10 at one end of the grip are substantially cylindrical, and in practice the convolutions initially are of such a size as to require them to be somewhat expanded in order to receive the handle bar A. Thus the resiliency of the convolutions 10 will hold the grip in position on the handle bar. The grip is given such a length that a plurality of the convolutions 10 may be slipped onto the bar A, leaving a free projecting end of the grip beyond the handle bar.

The convolutions at the outer end of the handle bar are so formed as to present together a knob-like formation constituting a hand hold. Thus the convolutions 11, 12, are made of increasing diameter, and the convolutions 13, 14, beyond the one of greatest diameter are again of decreasing size, the end convolution 14 desirably being small.

By the described formation, the elements 11, 12, 13 and 14 afford a firm hold for the user, and with the adjacent free convolutions, they absorb largely the shock and jar. Any outward pull on the grip in the direction of its axis will tend to constrict the coils 10 on the handle bar A and cause it to hold it tightly.

Having thus described my invention, what I claim as new and desire to secure by Letters Patent, is:

1. A handle bar grip in the form of a wire coil presenting substantially cylindrical convolutions at one end adapted to be expanded onto a handle bar, the said grip being of a length to present a plurality of convolutions beyond the gripping convolutions, and constitute a hand hold.

2. A handle bar grip in the form of a wire coil presenting substantially cylindrical convolutions at one end adapted to be expanded onto a handle bar, the said grip being of a length to present a plurality of convolutions beyond the gripping convolutions, and constitute a hand hold, there being convolutions of increasing size near the outer end of the grip, and convolutions of decreasing size at the extreme end.

In testimony whereof I have subscribed my name to this specification in the presence of two subscribing witnesses.

THOMAS FRANKLIN STANTON.

Witnesses:
 D. W. EDDY,
 E. J. PEMBLETON.